(12) United States Patent
Lee et al.

(10) Patent No.: US 7,760,279 B2
(45) Date of Patent: Jul. 20, 2010

(54) DISPLAY PANEL AND METHOD OF FORMING THEREOF

(75) Inventors: Jae-Young Lee, Yongin-si (KR); Won-Sang Park, Yongin-si (KR); Hae-Young Yun, Suwon-si (KR); Sang-Woo Kim, Suwon-si (KR); Jae-Ik Lim, Seoul (KR); Seung-Kyu Lee, Suwon-si (KR); Chang-Woo Shim, Seoul (KR); Yong-Suk Yeo, Jecheon-si (KR); Ji-Youn Choi, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 539 days.

(21) Appl. No.: 11/606,068

(22) Filed: Nov. 28, 2006

(65) Prior Publication Data

US 2007/0195239 A1 Aug. 23, 2007

(30) Foreign Application Priority Data

Feb. 23, 2006 (KR) ...................... 10-2006-0017765

(51) Int. Cl.
 G02F 1/136 (2006.01)
 G02F 1/1343 (2006.01)
(52) U.S. Cl. ............................ 349/42; 349/44; 349/144
(58) Field of Classification Search .................. 349/44, 349/144
 See application file for complete search history.

(56) References Cited

U.S. PATENT DOCUMENTS 7,538,846 B2 * 5/2009 Yoshida et al. .............. 349/147

2004/0141133 A1 7/2004 Sonoda et al. .............. 349/142
2004/0150777 A1 * 8/2004 Koike .......................... 349/139
2005/0122452 A1 6/2005 Yoshida et al. .............. 349/114

FOREIGN PATENT DOCUMENTS

| CN | 1693978 A | 11/2005 |
|---|---|---|
| JP | 2001-235751 | 8/2001 |
| JP | 2001-242466 | 9/2001 |
| JP | 2002-148649 | 5/2002 |
| JP | 2004-037854 | 2/2004 |
| JP | 2005-227482 | 8/2005 |
| JP | 2005-321522 | 11/2005 |
| KR | 1020010039258 A | 5/2001 |
| KR | 1020020027709 A | 4/2002 |
| KR | 1020040034872 A | 4/2004 |
| KR | 1020040082487 A | 9/2004 |
| KR | 1020050038561 A | 4/2005 |
| KR | 1020050092851 A | 9/2005 |

* cited by examiner

Primary Examiner—Uyen-Chau N Le
Assistant Examiner—Chris H Chu
(74) Attorney, Agent, or Firm—Cantor Colburn LLP

(57) ABSTRACT

A panel a gate line on a first substrate, a gate insulating layer covering the gate line, a semiconductor layer on the gate insulating layer, a data line intersecting the gate line and including a source electrode and a drain electrode facing the source electrode on the semiconductor layer, a connection assistant separated from the data line, a passivation layer covering the semiconductor layer and including contact holes exposing the connection assistant and a pixel electrode including a plurality of sub-pixel electrodes and formed on the passivation layer. The sub-pixel electrodes are connected to the connection assistant through the contact holes, are electrically connected to each other through the connection assistant and at least one of the sub-pixel electrodes is electrically connected to the drain electrode.

10 Claims, 11 Drawing Sheets

DISPLAY PANEL AND METHOD OF FORMING THEREOF

This application claims priority to Korean Patent Application No. 10-2006-0017765 filed in the Korean Intellectual Property Office on Feb. 23, 2006 and the entire contents of which are incorporated herein by reference.

BACKGROUND OF THE INVENTION (a) Field of the Invention

The present invention relates to a thin film transistor array panel for a liquid crystal display.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

Among the LCDs, a vertical alignment (VA) mode LCD, which aligns LC molecules such that the long axes of the LC molecules are perpendicular to the panels in the absence of an electric field, is spotlighted because of its high contrast ratio and wide reference viewing angle.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed in several directions by using the cutouts and the protrusions such that the reference viewing angle is widened.

However, because the LC molecules disposed in the corner or the connection assistants in the field-generating electrodes are not influenced by the fringe field, they are arranged in arbitrary directions in the application of a driving voltage.

When the LC molecules are arbitrarily arranged, collisions of the LC molecules may be generated in the arbitrary positions, and an undesired afterimage due to the collisions may be generated.

BRIEF SUMMARY OF THE INVENTION

An exemplary embodiment provides a liquid crystal display having improved display characteristics by maximizing the LC molecules influenced by the fringe field and minimizing the afterimage due to the collisions.

An exemplary embodiment of a panel is provided, the panel including a first substrate, a gate line formed on the first substrate, a gate insulating layer covering the gate line, a semiconductor layer formed on the gate insulating layer, a data line intersecting the gate line and including a source electrode formed on the semiconductor layer, a drain electrode formed on the semiconductor layer and facing the source electrode, a connection assistant separated from the data line, a passivation layer covering the semiconductor layer and having contact holes exposing the connection assistant, and a pixel electrode including a plurality of sub-pixel electrodes and formed on the passivation layer. The sub-pixel electrodes are respectively connected to the connection assistant through the contact holes, the sub-pixel electrodes are electrically connected to each other through the connection assistant and at least one of the sub-pixel electrodes is electrically connected to the drain electrode.

In an exemplary embodiment, the sub-pixel electrodes may include transmission electrodes.

In an exemplary embodiment, at least one of the sub-pixel electrodes includes a reflection electrode.

In an exemplary embodiment, the sub-pixel electrodes may have a substantially rectangle shape with rounded corners.

In an exemplary embodiment, the panel may further include a second substrate facing the first substrate, and a common electrode formed on the second substrate and having a plurality of cutouts respectively formed on the center of the sub-pixel electrodes.

In an exemplary embodiment, the cutouts may have a substantially circular shape.

In an exemplary embodiment, a panel is provided, the panel including a first substrate, a gate line formed the first substrate, a data line intersecting the gate line, a thin film transistor connected to the gate line and the data line, and a pixel electrode connected to the thin film transistor and having a plurality of sub-pixel electrodes and connection assistants connecting the sub-pixel electrodes to each other. The connection assistants are alternatively disposed on the left and the right sides of the pixel electrode and connect the sub-pixel electrodes to each other.

In an exemplary embodiment, the panel may further include a second substrate facing the first substrate, a light blocking member formed on the second substrate and a common electrode formed on the second substrate. The connection assistants overlap the light blocking member.

In an exemplary embodiment, the sub-pixel electrodes may have a substantially rectangular shape with rounded corners. The connection assistants are alternately connected to edges of the left and the right of the sub-pixel electrodes.

In an exemplary embodiment, the common electrode may have a plurality of cutouts and the cutouts may have a substantially circular shape.

An exemplary embodiment of a method of forming a display panel is provided, the method including forming a gate line, a data line and a drain electrode on a first substrate, forming a thin film transistor on the first substrate and connected to the gate line and the data line; connecting a pixel electrode to the thin film transistor, the pixel electrode including a plurality of sub-pixel electrodes and forming a connection assistant connecting the sub-pixel electrodes to each other. The data line intersects the gate line and the drain electrode faces the data line. At least one of the sub-pixel electrodes is connected to the drain electrode.

In an exemplary embodiment, the forming a connection assistant includes forming the connection assistant on a different layer of the array panel than the pixel electrode.

In an exemplary embodiment, the forming a connection assistant includes forming the connection assistant on a same layer of the array panel as the pixel electrode. The connection assistant includes a first connection portion and a second connection portion. The first connection portion and the second connection portion are connected to edges of the sub-pixel electrodes and are alternately disposed towards left and right sides of the pixel electrode.

BRIEF DESCRIPTION OF THE DRAWINGS

The present invention will become more apparent by describing embodiments thereof in detail with reference to the accompanying drawings, in which.

DETAILED DESCRIPTION OF INVENTION

Figure 1:
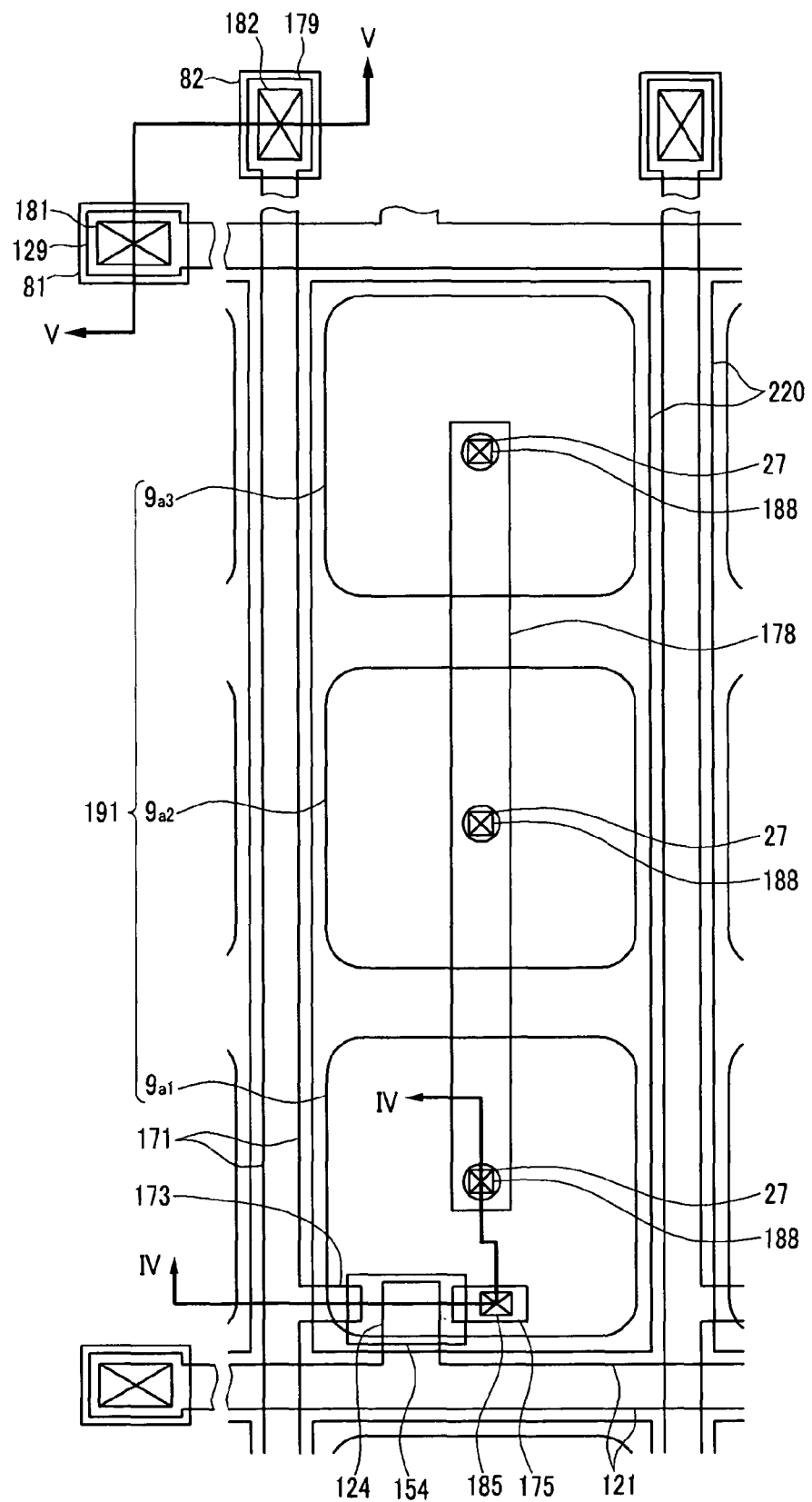
FIG. 1 is a layout view of an exemplary embodiment of an LCD according to the present invention.

The present invention will now be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films, and regions are exaggerated for clarity. Like numerals refer to like elements throughout. It will be understood that when an element such as a layer, film, region, or substrate is referred to as being "on" or "connected to" another element, it can be directly on the other element or intervening elements may also be present. In contrast, when an element is referred to as being "directly on" another element, there are no intervening elements present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings. Now, exemplary embodiments of liquid crystal displays and thin film transistor (TFT) array panels for LCDs according to the present invention will be described with reference to the accompanying drawings.

An exemplary embodiment of an LCD according the present invention will be described in detail with reference to FIGS. 1 to 5.

Figure 2:
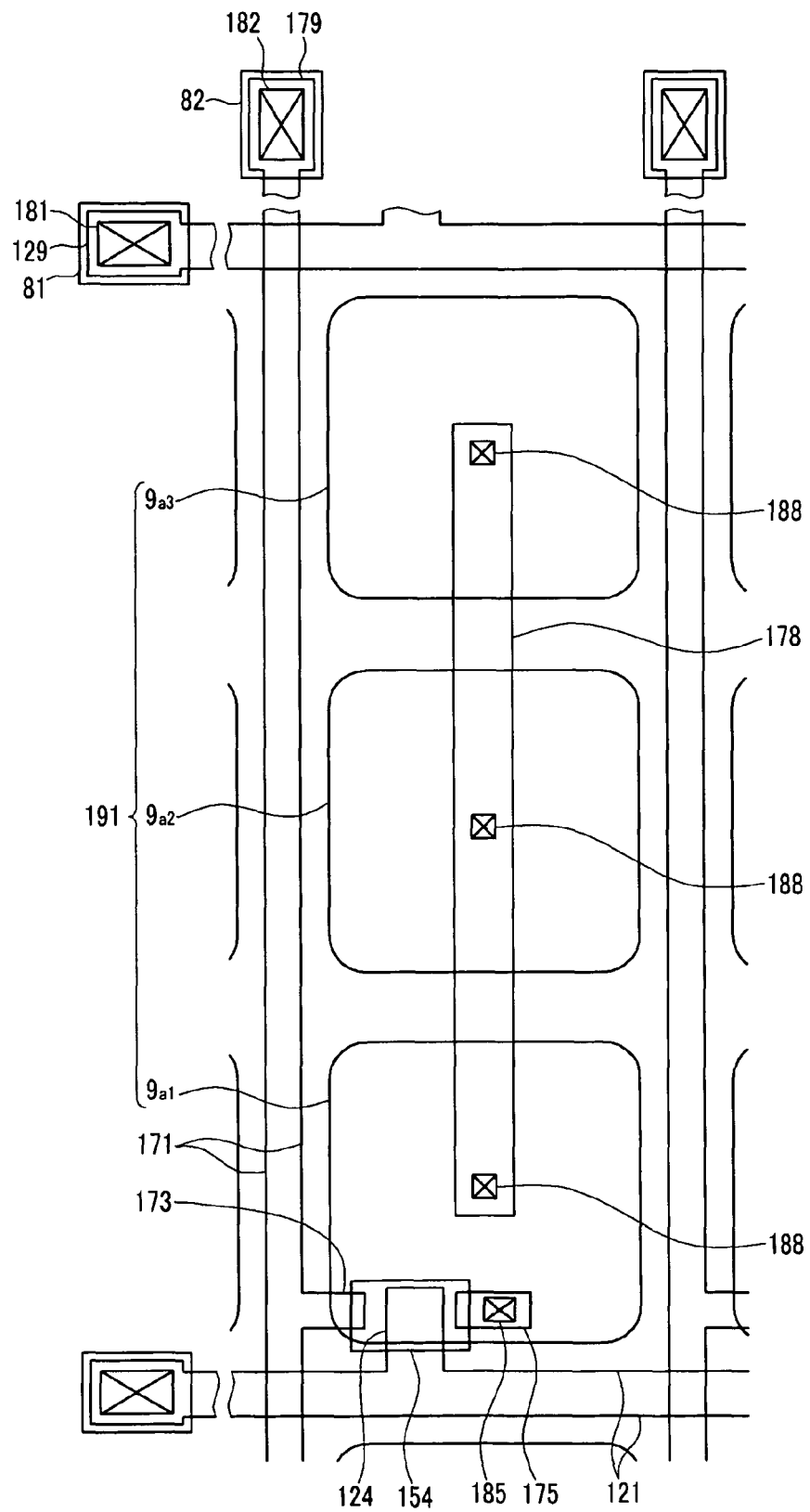
FIG. 2 is a layout view of an exemplary embodiment of a TFT array panel of the LCD shown in FIG. 1 according to the present invention.
Figure 3:
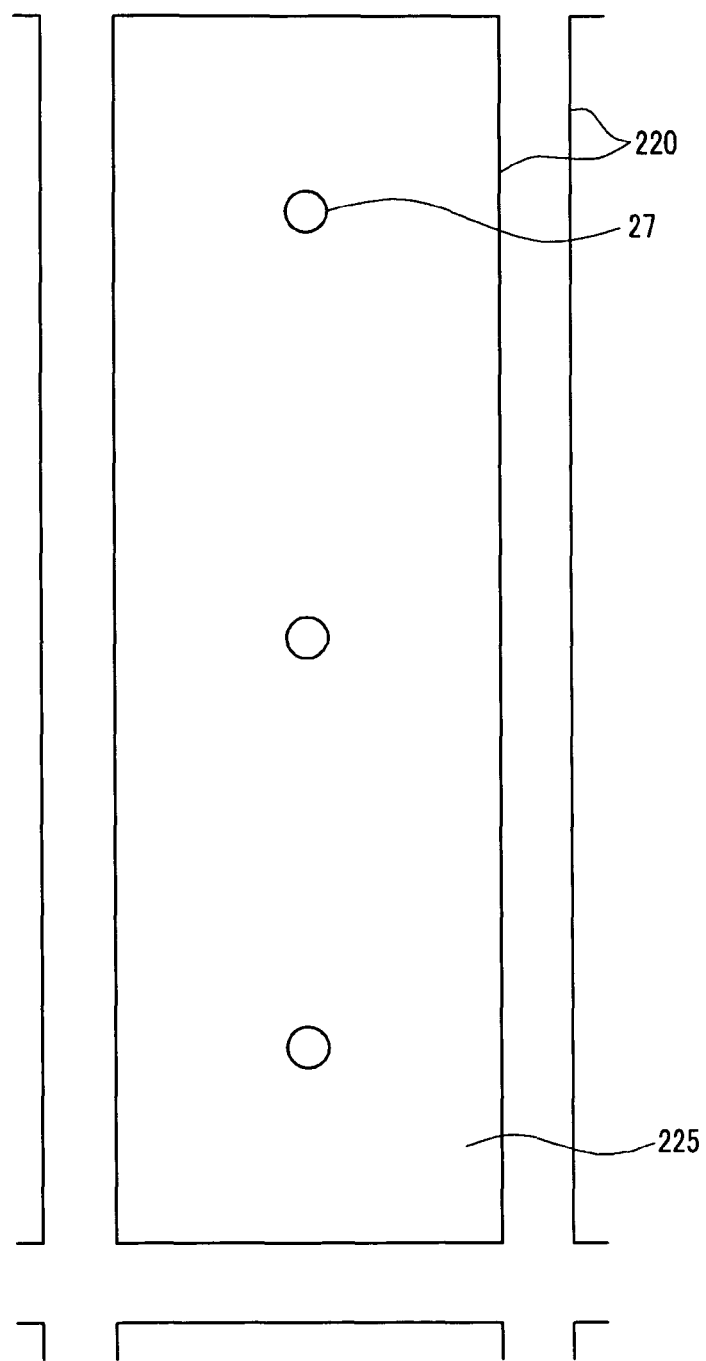
FIG. 3 is a layout view of an exemplary embodiment of a common electrode panel of the LCD shown in FIG. 1 according to the present invention.
Figure 4:
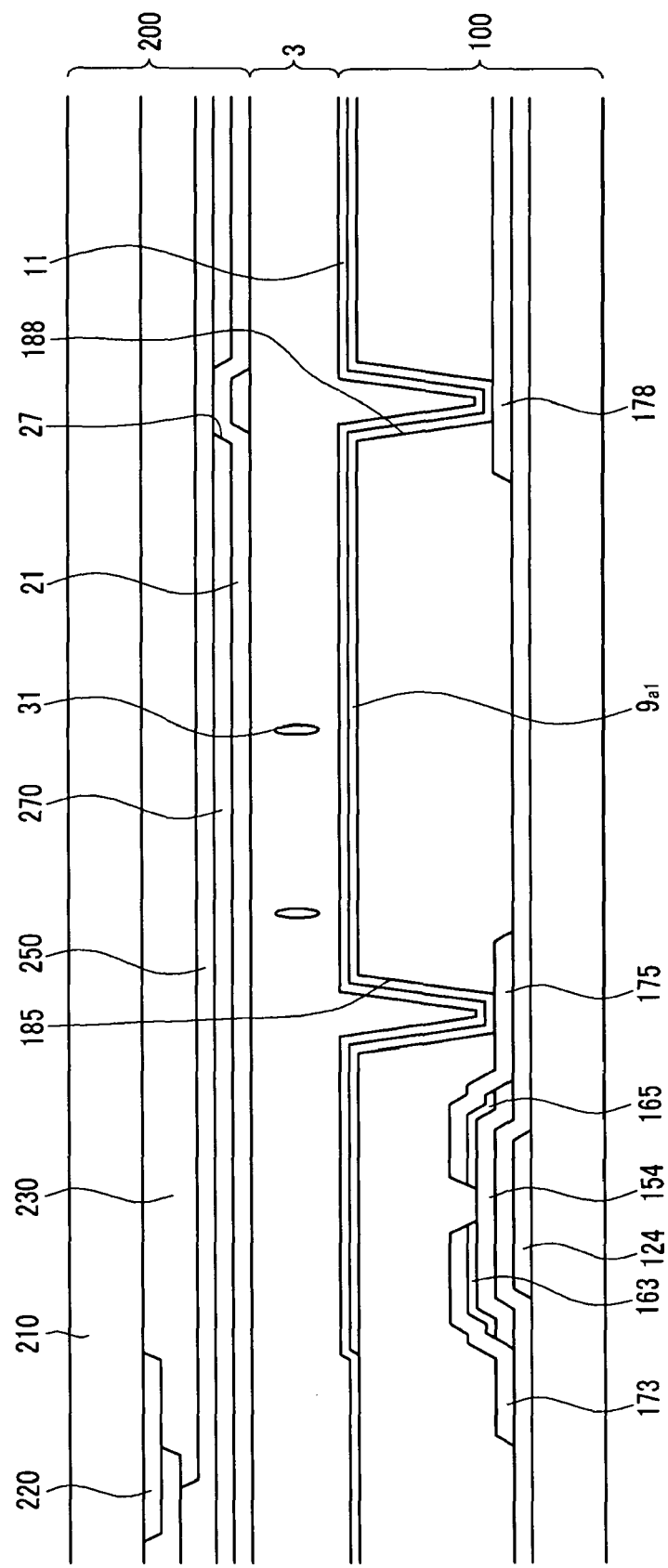
FIG. 4 is a cross-sectional view of the LCD shown in FIG. 1 taken along line IV-IV.
Figure 5:
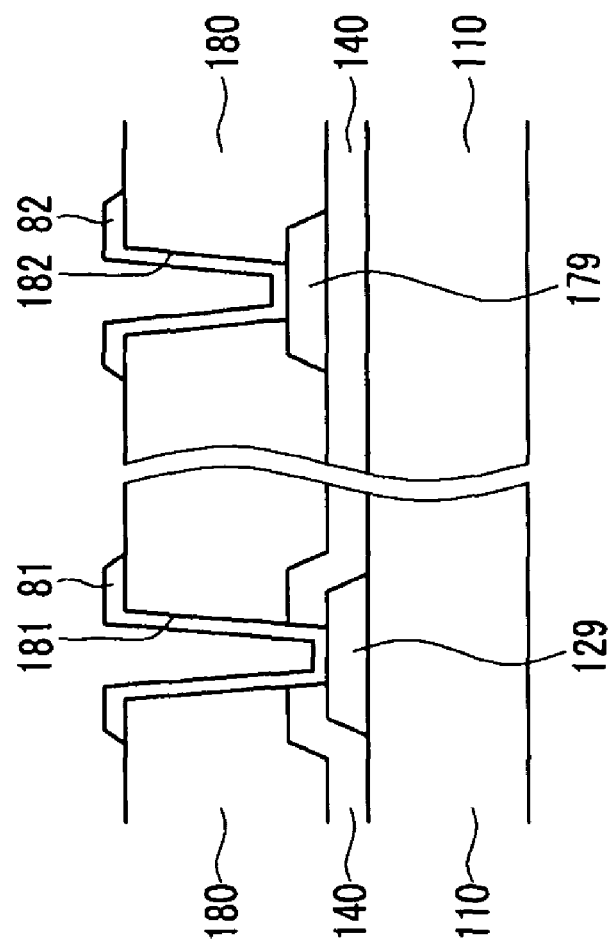
FIG. 5 is a cross-sectional view of the LCD shown in FIG. 1 taken along line V-V.

FIG. 1 is an exemplary embodiment of a layout view of an LCD according to the present invention, FIG. 2 is a layout view of an exemplary embodiment of a TFT array panel of the LCD shown in FIG. 1 according to the present invention, FIG. 3 is a layout view of an exemplary embodiment of a common electrode panel of the LCD shown in FIG. 1 according to the present invention, FIG. 4 is a cross-sectional view of the LCD shown in FIG. 1 taken along line IV-IV and FIG. 5 is a cross-sectional view of the LCD shown in FIG. 1 taken along line V-V.

An LCD includes a TFT array panel 100, a common electrode panel 200, and an LC layer 3 interposed between the panels 100 and 200.

The TFT array panel 100 is now described in detail with reference FIGS. 1, 2, 4, and 5.

A plurality of gate (signal) lines 121 are formed on an insulating substrate 110 made of a material such as transparent glass.

The gate lines 121 extend substantially in a transverse direction, are separated from each other and transmit gate signals. Each gate line 121 includes a plurality of projections forming a plurality of gate electrodes 124 projecting upward and an end portion 129 having a large area for contact with another layer or an external driving circuit. A gate driving circuit (not shown) for generating the gate signals may be mounted on a flexible printed circuit (FPC) film (not shown). The FPC may be attached to the substrate 110, directly mounted on the substrate 110, or integrated into the substrate 110. The gate lines 121 may extend to be connected to a driving circuit that may be integrated with the substrate 110.

In an exemplary embodiment, the gate lines 121 may be made of an Al-containing metal such as Al and an Al alloy, a Ag-containing metal such as Ag and a Ag alloy, a Cu-containing metal such as Cu and a Cu alloy, a Mo-containing metal such as Mo and a Mo alloy, Cr, Ti, or Ta. The gate lines 121 and the storage electrode lines (not shown) may have a multi-layered structure including two films having different physical characteristics. In an exemplary embodiment, one of the two films may be made of a low resistivity metal including, but not limited to, an Al-containing metal, a Ag-containing metal, and a Cu-containing metal for reducing signal delay or voltage drop in the gate lines 121 and the storage electrode lines. The other film may be made of a material such as a Mo-containing metal, Cr, Ta, or Ti, which has good physical, chemical, and electrical contact characteristics with other materials such as indium tin oxide (ITO) or indium zinc oxide (IZO). In one exemplary embodiment, the combination of the two films include a lower Cr film and an upper Al alloy film, and a lower Al film and an upper Mo film. However, the gate line 121 and the storage electrode line may be made of various metals or conductors as is suitable for the purpose described herein.

As in the illustrated embodiment of FIGS. 4 and 5, lateral sides of the gate lines 121 are inclined relative to a surface of the substrate 110. An inclination angle of the gate lines 121 relative to the surface of the substrate ranges from about 30 to about 80 degrees.

A gate insulating layer 140 is formed on the gate lines 121 and the storage electrode lines. In one exemplary embodiment, the gate insulating layer 140 may be made of silicon nitride (SiNx)

A plurality of semiconductor islands 154 are formed on the gate insulating layer 140. As in the illustrated exemplary embodiment, each semiconductor island 154 is disposed on the gate electrodes 124. In one exemplary embodiment, the semiconductor islands 154 are made of hydrogenated amorphous silicon (abbreviated to "a-Si") or polysilicon.

A plurality of ohmic contact islands 163 and 165 are formed on the semiconductor islands 154. As in the illustrated exemplary embodiment, each ohmic contact islands 163 and 165 are located in pairs on the semiconductor islands 154. In one exemplary embodiment, the ohmic contact islands 163 and 165 are made of silicide or n+ hydrogenated a-Si heavily doped with an n-type impurity such as phosphorous As in the illustrated embodiment, lateral sides of the semiconductor islands 154 and the ohmic contacts 163 and 165 are inclined relative to a surface of the substrate 110 The inclination angles thereof are in a range between about 30 to about 80 degrees.

A plurality of data lines 171, a plurality of drain electrodes 175 separated from the data lines 171, and a plurality of connection (assistant) members 178 are formed on the ohmic contacts 163 and 165 and the gate insulating layer 140.

The data lines 171 transmitting data voltages extend substantially in the longitudinal direction and cross the gate lines 121 at substantially right angles. Each data line 171 includes an end portion 179 having a relatively large area for contact with another layer and/or an external device. A data driving circuit (not shown) for generating data signals may be mounted on an FPC film (not shown). The FPC may be attached to the substrate 110, directly mounted on the substrate 110, or integrated into the substrate 110. The data lines 171 may extend to be connected to a driving circuit that may be integrated with the substrate 110. Each data line 171 includes a plurality of source electrodes 173 projecting toward the gate electrodes 124.

Each drain electrode 175 is separated from the data lines 171 and faces the source electrodes 173 with respect to the gate electrode 124.

A gate electrode 124, a source electrode 173, and a drain electrode 175 along with the semiconductor island 154 form a TFT. The TFT has a channel formed in the semiconductor island 154 and disposed between the source electrode 173 and the drain electrode 175.

The connection assistants 178 extend substantially parallel to the data lines 171 and are separated from the data lines 171.

In one exemplary embodiment, the data lines 171, the drain electrodes 175, and the connection assistants 178 are made of a refractory metal such as Cr, Mo, Ti, Ta, or alloys thereof. The data lines 171, the drain electrodes 175, and the connection assistants 178 may also have a multilayered structure including a low-resistivity film (not shown) and a good-contact film (not shown). In one exemplary embodiment, the multilayered structure includes a combination of a lower Mo (alloy) film, an intermediate Al (alloy) film, and an upper Mo (alloy) film as well as the above-described combinations of a lower Cr film and an upper Al (alloy) film and a lower Al (alloy) film and an upper Mo (alloy) film. However, the data lines 171, the drain electrodes 175, and the connection assistants 178 may be made of various metals or conductors as is suitable for the purpose described herein.

The data lines 171 and the drain electrodes 175 may have tapered lateral sides and the inclination angles thereof may range about 30 to about 80 degrees.

The ohmic contacts 163 and 165 are interposed only between the underlying semiconductor islands 154 and the overlying data lines 171 and the overlying drain electrodes 175 thereon and reduce the contact resistance therebetween. The semiconductor islands 154 include a plurality of exposed portions, which are not covered with the data lines 171 and the drain electrodes 175, such as portions located between the source electrodes 173 and the drain electrodes 175.

A passivation layer 180 is formed on the data lines 171, the drain electrodes 175, the connection assistants 178 and the exposed portions of the semiconductors 154. In one exemplary embodiment, the passivation layer 180 is made of an inorganic insulator including, but not limited to, silicon nitride or silicon oxide, a photosensitive organic material having a good flatness characteristic, or a low dielectric insulating material having a dielectric constant lower than 4.0 such as a-Si:C:O and a-Si:O:F formed by plasma enhanced chemical vapor deposition (PECVD). The passivation layer 180 may include a multilayer structure having a lower film of an inorganic insulator and an upper film of an organic insulator such that it takes the excellent insulating characteristics of the organic insulator while preventing the exposed portions of the semiconductors 154 from being damaged by the organic insulator.

The passivation layer 180 has a plurality of contact holes 182, 185, and 188 exposing the end portions 179 of the data lines 171, the end portions of the drain electrodes 175 and the connection assistants 178, respectively. The passivation layer 180 and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180. In one exemplary embodiment the pixel electrodes 191 and contact assistants 81 and 82 may be made of a transparent conductor such as ITO or IZO or a reflective conductor such as Ag or Al.

The pixel electrodes 191 include first to third sub-pixel electrodes $9a1$, $9a2$, and $9a3$, which are arranged substantially in a line and have a substantially squareshape. The. The sub-pixel electrodes $9a1$, $9a2$, and $9a3$ may have rounded corners in a layout view. The first sub-pixel electrode $9a1$ is connected to the drain electrode 175 through the contact hole 185, and the first to third sub-pixel electrodes $9a1$, $9a2$, and $9a3$ are respectively connected to the connection assistants 178 through contact holes 188.

The pixel electrodes 191 are physically and electrically connected to the drain electrodes 175 through the first sub-pixel electrode $9a1$ such that the pixel electrodes 191 receive the data voltages from the drain electrodes 175 and the second and third sub-pixel electrodes $9a2$ and $9a3$ receive the data voltages from the connection assistants 178.

The pixel electrodes 191 supplied with the data voltages generate electric fields in cooperation with a common electrode 270, which determine the orientations of liquid crystal molecules in the liquid crystal layer 3.

A pixel electrode 191 and the common electrode 270 of the common electrode panel 200 form a liquid crystal capacitor, which stores applied voltages after turn-off of the TFT.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and complement the adhesion of the end portions 129 and 179 and external devices.

The description of the common electrode panel 200 follows with reference to FIGS. 1, 3, and 5.

A light blocking member 220 called a black matrix for preventing light leakage is formed on an insulating substrate 210 made of a material such as transparent glass. The light blocking member 220 includes a plurality of openings 225 that face the pixel electrodes 191 and has substantially the same planar shape as the pixel electrodes 191.

A plurality of color filters 230 are formed on the substrate 210. The color filters 230 are disposed substantially in the areas enclosed or surrounded by the light blocking member 220. As in the illustrated embodiment, the color filters 230 may extend substantially along the longitudinal direction along the pixel electrodes 191. In one exemplary embodiments, the color filters 230 may represent one of the primary colors such as red, green, and blue colors.

An overcoat 250 for preventing the color filters 230 from being exposed and for providing a substantially flat surface is formed on the color filters 230 and the light blocking member 220. In exemplary embodiments, the overcoat 250 may be omitted.

In one exemplary embodiment the common electrode 270 made of a transparent conductive material such as ITO and IZO is formed on the overcoat 250 and is relatively thicker than the pixel electrode 191.

The common electrode 270 has a plurality of sets of circular cutouts 27.

A set of circular cutouts 27 faces substantially the center of the first to third sub-pixel electrodes $9a1$ to $9a3$. In an exemplary embodiment, the circular cutouts 27 overlap the contact holes 188.

Alignment layers 11 and 21 are coated on inner surfaces of the panels 100 and 200. The alignment layers 11 and 21 may be homeotropic. Polarizers (not shown) may be provided on outer surfaces of the panels 100 and 200 such that their polarization axes may be crossed and one of the transmissive axes may be parallel to the gate lines 121. In an exemplary embodiment, one of the polarizers may be omitted when the LCD is a reflective LCD.

The LCD may further include at least one retardation film (not shown) for compensating the retardation of the LC layer 3. The retardation film has birefringence and retards opposite to the LC layer 3. The retardation film may include a uniaxial or biaxial optical compensation film, and in particular, a negative uniaxial compensation film.

The LCD may further include a backlight unit (not shown) for supplying light to the LC layer 3 through the polarizers, the retardation film, and the panels 100 and 200.

In an exemplary embodiment, the LC layer 3 has negative dielectric anisotropy and is subjected to a vertical alignment such that the LC molecules 31 in the LC layer 3 are aligned with their long axes substantially vertical to the surfaces of the panels 100 and 200 in the absence of an electric field. Accordingly, incident light cannot pass the crossed polarization system including the polarizers.

Upon application of the common voltage to the common electrode 270 and a data voltage to the pixel electrodes 191, an electric field substantially perpendicular to the surfaces of the panels 100 and 200 is generated. The LC molecules 31 tend to change their orientations in response to the electric field such that their long axes are substantially perpendicular to the field direction. The common electrode 270 and the pixel electrodes 191 are essentially used as a field-generating electrode.

The circular cutouts 27 of the common electrode 270 and edges of the pixel electrodes 191 distort the electric field to have a horizontal component that is substantially perpendicular to the edges of the circular cutouts 27 and the edges of the pixel electrodes 191. Accordingly, the LC molecules on each sub-pixel electrodes $9a1$-$9a3$ are tilted in a direction by the horizontal component and the azimuthal distribution of the tilt directions are localized to various directions, thereby increasing the viewing angle of the LCD.

Furthermore, when the pixel electrode includes a connection that connects the sub-pixel electrodes $9a1$-$9a3$ and is formed on the same layer as the pixel electrode 191, the connection distorts the alignments of the LC molecules 31 and the LC molecules 31 on the connection are aligned with arbitrary directions. Accordingly, the collisions of the LC molecules are generated. However, in the illustrated exemplary embodiment, the sub-pixel electrodes $9a1$-$9a3$ are connected to each other through the connection assistants 178 formed on the same layer as the data lines 171. Here, the connection assistants 178 do not influence the alignment of the LC molecules, and therefore the collisions of the LC molecules are not generated. Advantageously, the undesired afterimage due to the collisions is not generated.

Another exemplary embodiment of an LCD according to the present invention will now be described in detail with reference to FIGS. 6 and 7.

Figure 6:
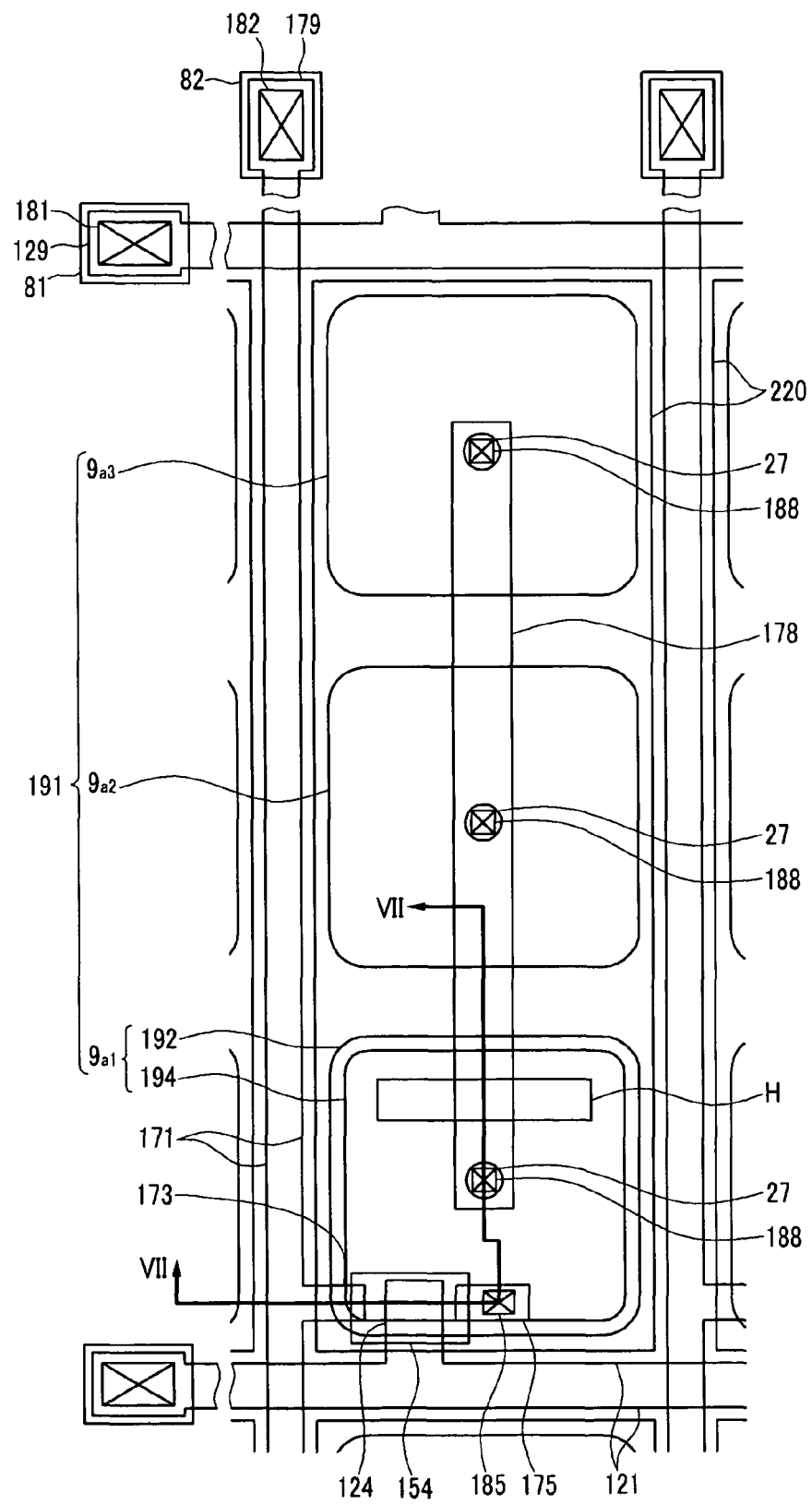
FIG. 6 is a layout view of another exemplary embodiment of an LCD according to the present invention.
Figure 7:
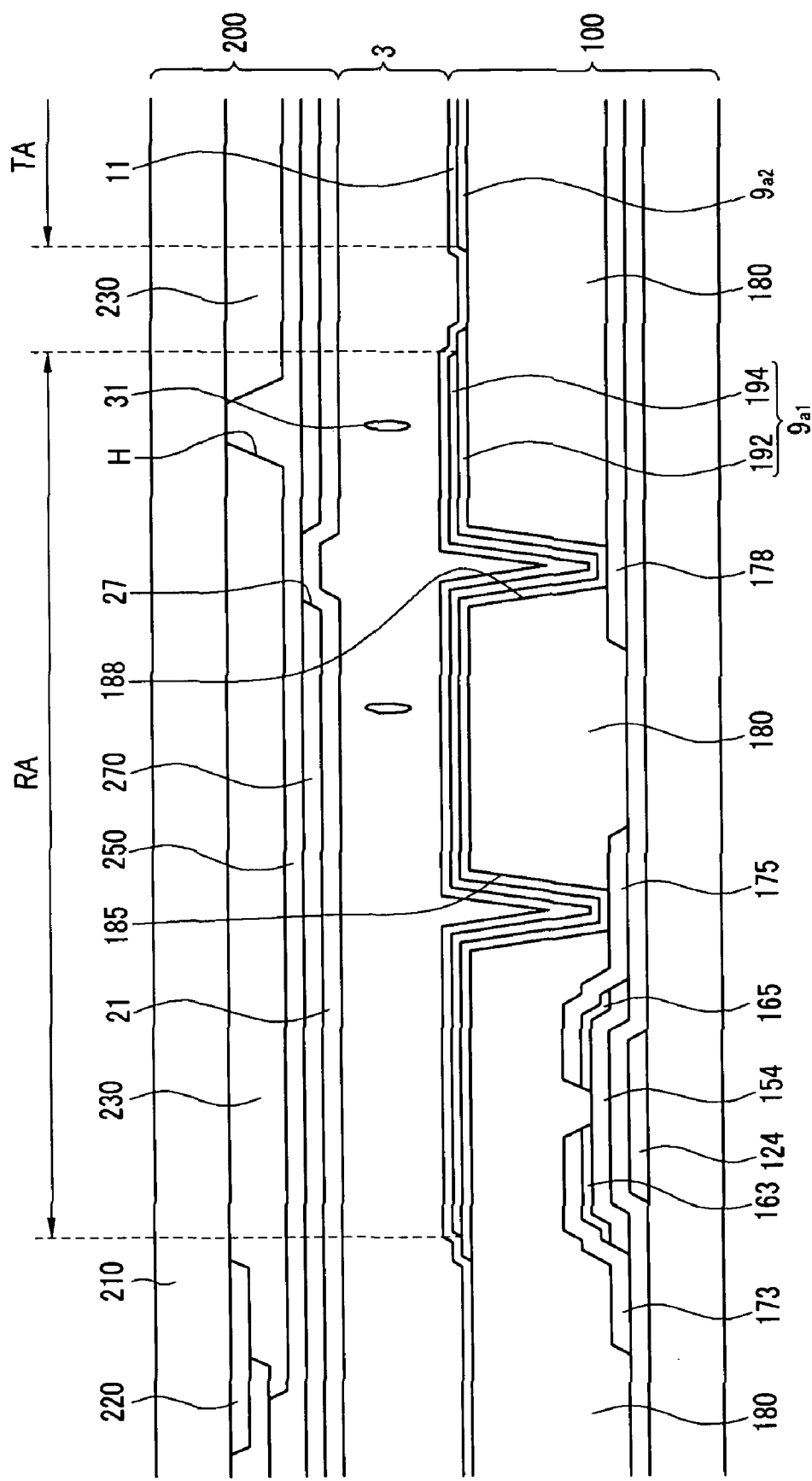
FIG. 7 is a cross-sectional view of the LCD shown in FIG. 6 taken along line VI-VI.

FIG. 6 is a layout view of an exemplary embodiment of a TFT array panel for an LCD according to the present invention, and FIG. 7 is a cross-sectional view of the LCD shown in FIG. 6 taken along line VII-VII.

Referring to FIGS. 6 and 7, an LCD includes a TFT array panel 100, a common electrode panel 200, an LC layer 3 interposed between the panels 100 and 200, and a pair of polarizers (not shown) attached on outer surfaces of the panels 100 and 200.

Layered structures of the panels 100 and 200 according to this embodiment are substantially the same as those shown in FIGS. 1 to 5.

Regarding the TFT array panel 100, a plurality of gate lines 121 including gate electrodes 124 and end portions 129 are formed on a substrate 110, and a gate insulating layer 140, a plurality of semiconductors 154, and a plurality of ohmic contacts 163 and 165 are sequentially formed thereon. A plurality of data lines 171 including source electrodes 173 and end portions 179, a plurality of drain electrodes 175, and a plurality of connection assistants 178 are formed on the ohmic contacts 163 and 165, and a passivation layer 180 is formed thereon. A plurality of contact holes 181, 182, 185, and 188 are provided at the passivation layer 180 and the gate insulating layer 140. A plurality of pixel electrodes 191 and a plurality of contact assistants 81 and 82 are formed on the passivation layer 180, and an alignment layer 11 is coated thereon.

Regarding the common electrode panel 200, a light blocking member 220, a plurality of color filters 230, a common electrode 270 including a plurality of circular cutouts 27, and an alignment layer 21 are formed on an insulating substrate 210.

Different from the LCD shown in FIGS. 1 to 4, the LCD in the illustrated embodiment of FIGS. 6 and 7 is a transflective type that includes a reflective electrode.

The LCD including the TFT array panel 100, the common electrode panel 200, and the LC layer 3 has a transmission region TA and a reflection region RA. The transmission region TA includes a transmission electrode 192 and the reflection region RA includes a reflection electrode 194. The transmission region TA is a region where the reflection electrode 194 is not disposed and the reflection region RA is a region where the reflection electrode 194 is disposed.

The light in the transmission region TA passes through the liquid crystal layer 3 from the TFT array panel 100 to the common electrode panel 200 to display images, while the light in the reflection region RA passes through the liquid crystal layer 3 twice by being reflected by the reflection electrode 194 to display the images.

In exemplary embodiments, the passivation layer 180 may have an uneven surface to maximize diffused reflection and the reflection electrode 194 may also have an uneven surface depending on or corresponding to the uneven surface of the passivation layer 180.

In one exemplary embodiment, the transmission electrode 192 is made of a transparent conductive material such as ITO or IZO and the reflection electrode 194 is made of a reflective conductor such as Ag, Al, Cr, and their alloys. In exemplary embodiments, the reflection electrode 194 may have a double-layered structure including an upper layer (not shown) made of a reflective conductor such as Ag, Al, and their alloys having low resistance, and a lower layer material such as Mo, a Mo alloy, Cr, Ta, and Ti having good contact characteristics with other materials such as ITO and IZO.

The reflection electrode 194 is only disposed on the first sub-pixel electrode 9a1. In exemplary embodiments, the reflection electrode 194 may be disposed on the transmission electrode 192 on the other sub-pixel electrodes 9a2 and 9a3.

In exemplary embodiments, it is preferable that the color filters 230 corresponding to the transmission region TA are relatively thinner than those color filters 230 corresponding to the reflection region RA to twice form a cell gap in the transmission region TA by the cell gap of the reflection region RA. The color filters 230 corresponding to the reflection region RA may have light holes "H" to compensate the differences of color impression due to the differences of light paths.

Figure 8:
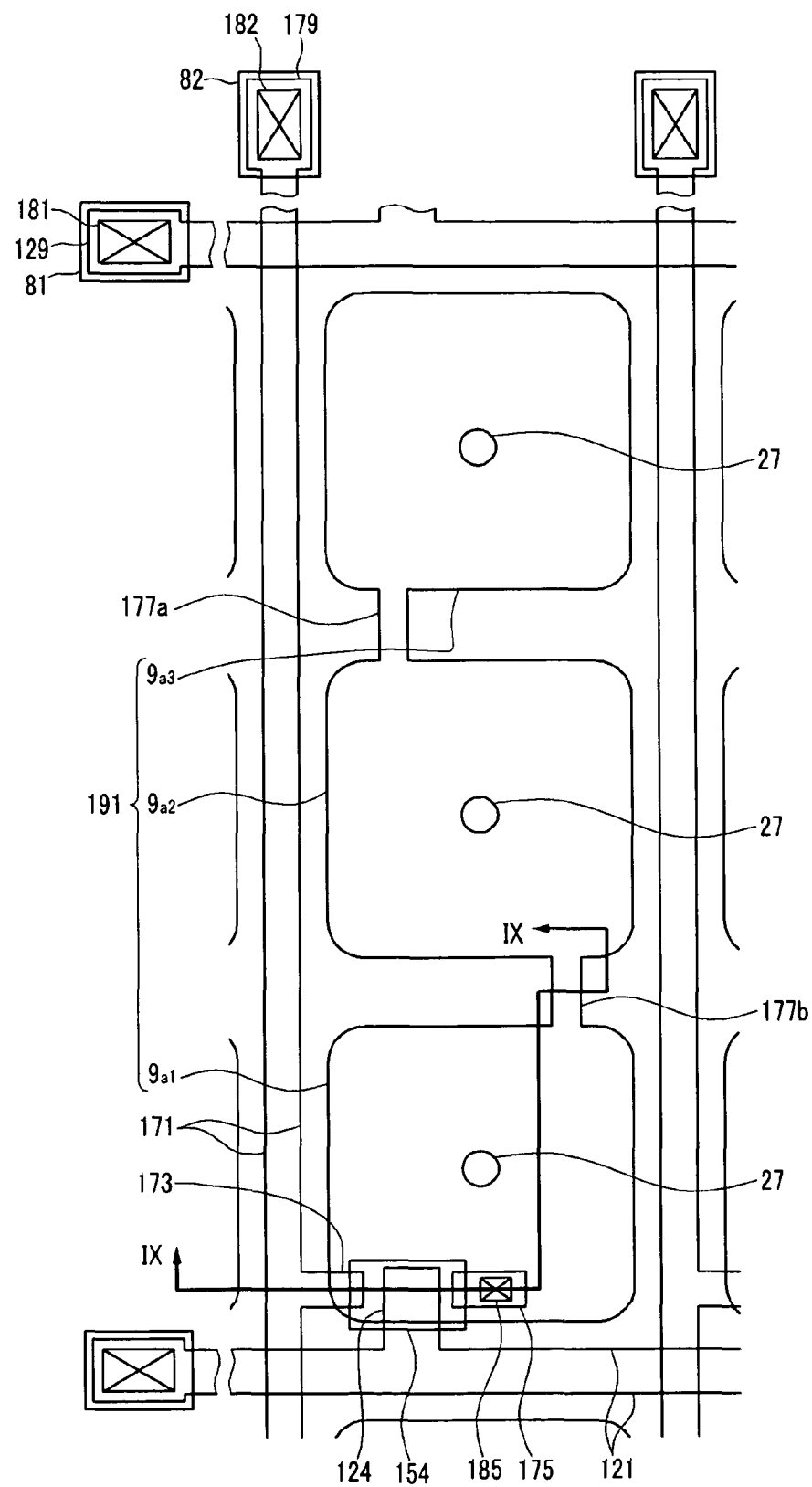
FIG. 8 is a layout view of another exemplary embodiment of an LCD according to the present invention.
Figure 9:
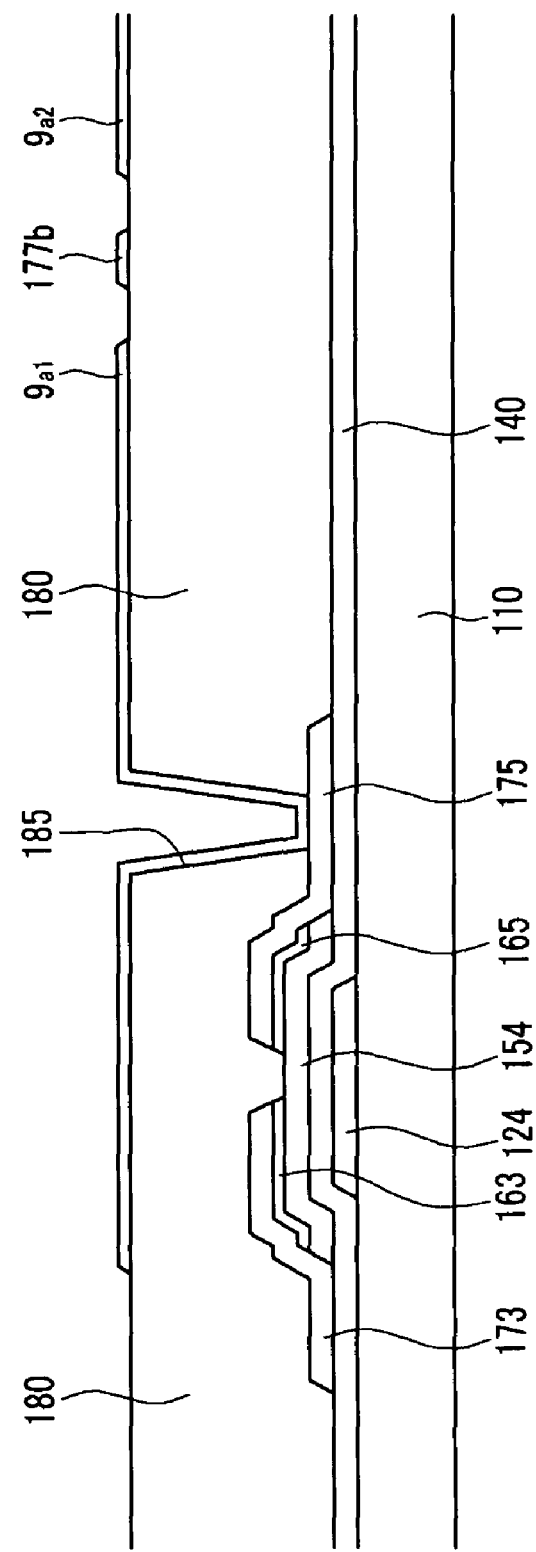
FIG. 9 is a cross-sectional view of the LCD shown in FIG. 8 taken along line IX-IX.
Figure 10:
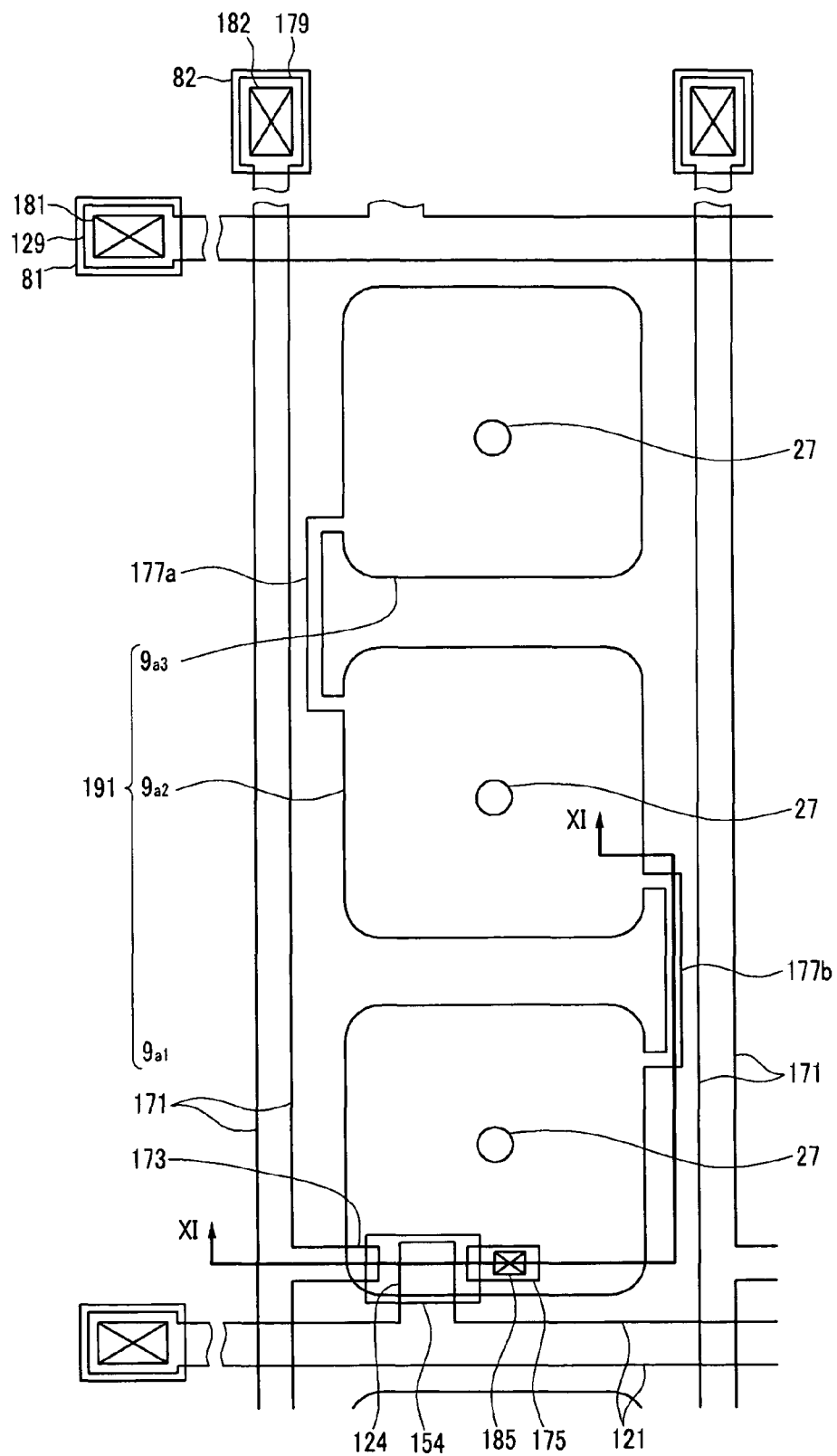
FIG. 10 is a layout view of another exemplary embodiment of an LCD according to the present invention.
Figure 11:
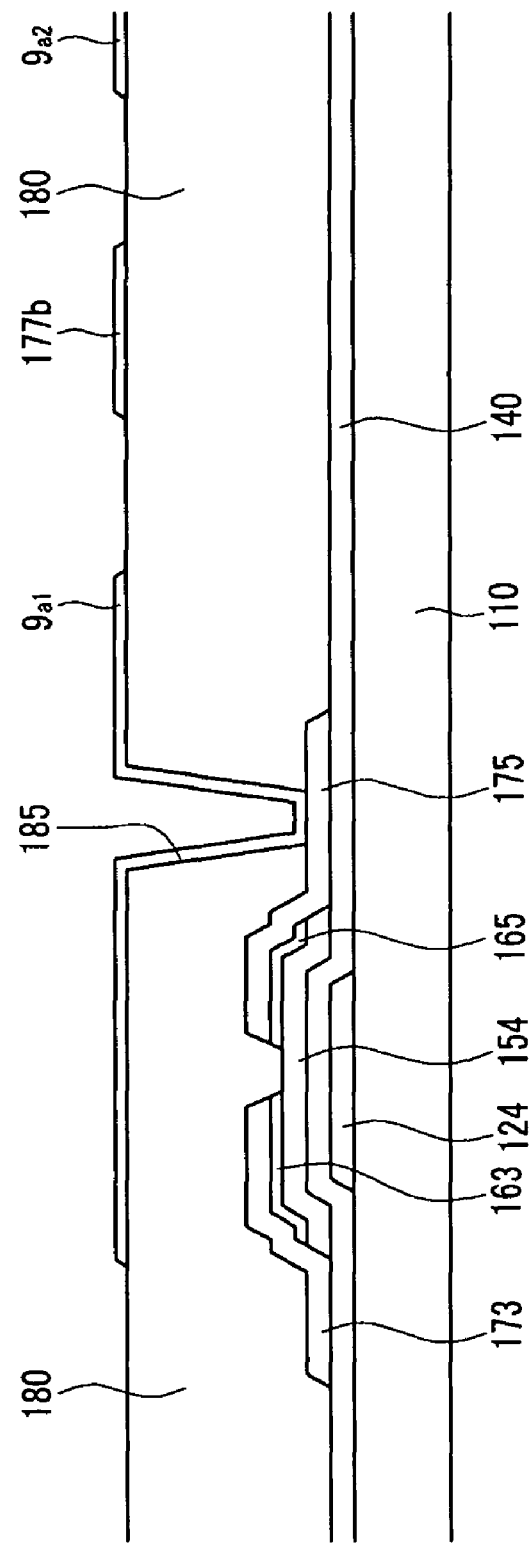
FIG. 11 is a cross-sectional view of the LCD shown in FIG. 10 taken along line XI-XI.

FIG. 8 is a layout view of another exemplary embodiment of an LCD according to the present invention, FIG. 9 is a cross-sectional view of the LCD shown in FIG. 8 taken along line IX-IX, FIG. 10 is a layout view of another exemplary embodiment of an LCD according to the present invention, and FIG. 11 is a cross-sectional view of the LCD shown in FIG. 10 taken along line XI-XI.

Layered structures of the panels 100 and 200 according to this embodiment are substantially the same as those shown in FIGS. 2 and 4.

As shown in FIGS. 8 and 9, a plurality of gate lines 121 including gate electrodes 124 and end portions 129 are formed on a substrate 110, and a gate insulating layer 140, a plurality of semiconductors 154, and a plurality of ohmic contacts 163 and 165 are sequentially formed thereon. A plurality of data lines 171 including source electrodes 173 and end portions 179, a plurality of drain electrodes 175, and a plurality of connection assistants 178 are formed on the ohmic contacts 163 and 165, and a passivation layer 180 is formed thereon. A plurality of contact holes 181, 182, and 185 are provided at the passivation layer 180 and the gate insulating layer 140. A plurality of pixel electrodes 191 and a plurality of contact assistants 81 and 82 are formed on the passivation layer 180.

Different from the LCD shown in FIGS. 2 and 4, in the illustrated embodiment of FIGS. 8 and 9, the first to third sub-pixel electrodes 9a1 to 9a3 of the pixel electrodes 191 are connected to each other through connection assistants 177 that are formed with the same layer as the pixel electrodes 191 in the LCD.

The connection assistants 177 include left and right connection assistants 177a and 177b that are respectively disposed in the left and right sides of the first to third sub-pixel electrodes 9a1 to 9a3 of the pixel electrodes 191. One connection assistant 177a is shown between the pair of sub-pixel electrodes 9a1 and 9a2 on a left side and the other connection assistant 177b is disposed between the pair of sub-pixel electrodes 9a2 and 9a3 on the right ride. The connection assistants 177a and 177b are formed within a columnar area defined by the pixel electrode 191, within the left and right edges of the of sub-pixel electrodes 9a1, 9a2 and 9a3 and alternate between the left and the right sides of the sub-pixel electrodes 9a1, 9a2 and 9a3. It is preferable that the left and right connection assistants 177a and 177b make a pair. In the illustrated exemplary embodiment, although the collisions of the LC molecules are generated, the collisions are disposed to one side of the pixel electrodes 191 such that it is difficult for them to be recognized.

As shown in the illustrated embodiments of FIGS. 10 and 11, a left connection assistant 177a is connected to the left sides (edges) of the first and second sub-pixel electrodes 9a1 and 9a2 and a right connection assistant 177b is connected to the right sides (edges) of the second and third sub-pixel electrodes 9a2 and 9a3. In this embodiment, the left and right connection assistants 177a and 177b are disposed adjacent to the data lines 171 Although the collisions of the LC molecules are generated, the collisions are hidden under the light blocking member (not shown) of an upper panel as the connection assistants 177a and 177b are disposed overlapping the light blocking member.

As in the illustrated embodiments, the sub-pixel electrodes of the pixel electrode are connected to each other by using the connection assistants that are formed with another layer or are disposed on the edges of the sub-pixel electrodes. Accordingly, the arrangements of the LC molecules are not scattered and the collisions of the LC molecules may be hidden.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A panel, comprising:
    a first substrate;
    a gate line formed on the first substrate;
    a gate insulating layer covering the gate line;
    a semiconductor layer formed on the gate insulating layer;
    a data line intersecting the gate line and including a source electrode formed on the semiconductor layer;
    a drain electrode formed on the semiconductor layer and facing the source electrode;
    a connection assistant separated from the data line;
    a passivation layer covering the semiconductor layer and including contact holes exposing the connection assistant; and
    a pixel electrode including a plurality of sub-pixel electrodes and formed on the passivation layer, wherein the sub-pixel electrodes of one pixel are respectively connected to the connection assistant through the contact holes, and
    wherein the sub-pixel electrodes of the one pixel are electrically connected to each other through the connection assistant and at least one of the sub-pixel electrodes is electrically connected to the drain electrode.

2. The panel of claim 1, wherein the sub-pixel electrodes include a transmission electrode.

3. The panel of claim 1, wherein at least one of the sub-pixel electrodes includes a reflection electrode.

4. The panel of claim 1, wherein the sub-pixel electrodes have a substantially rectangular shape with rounded corners.

5. The panel of claim 1, further comprising:
    a second substrate facing the first substrate; and
    a common electrode formed on the second substrate and including a plurality of cutouts respectively formed substantially on the center of the sub-pixel electrodes.

6. The panel of claim 1, wherein the cutouts have a circular shape.

7. The panel of claim 1, wherein the connection assistant is formed on same layer of the panel as the data line.

8. A method of forming a display panel, the method comprising:
    forming a gate line, a data line and a drain electrode on a first substrate, the data line intersecting the gate line and the drain electrode facing the data line;
    forming a thin film transistor on the first substrate and connected to the gate line and the data line;
    connecting a pixel electrode to the thin film transistor, the pixel electrode including a plurality of sub-pixel electrodes; and
    forming a connection assistant connecting the sub-pixel electrodes of one pixel to each other;
    wherein at least one of the sub-pixel electrodes is connected to the drain electrode.

9. The method of claim 8, wherein the forming a connection assistant comprises forming the connection assistant on a different layer of the array panel than the pixel electrode.

10. The method of claim 8, wherein the forming a connection assistant comprises forming the connection assistant on a same layer of the array panel as the pixel electrode, the connection assistant including a first connection portion and a second connection portion,
    wherein the first connection portion and the second connection portion are connected to edges of the sub-pixel electrodes and are alternately disposed towards left and right sides of the pixel electrode.

* * * * *